United States Patent
Koshoubu et al.

(10) Patent No.: US 7,693,689 B2
(45) Date of Patent: Apr. 6, 2010

(54) NOISE-COMPONENT REMOVING METHOD

(75) Inventors: Jun Koshoubu, Hachioji (JP); Tetsuji Sunami, Hachioji (JP); Kenichi Akao, Hachioji (JP); Keisuke Watanabe, Hachioji (JP)

(73) Assignee: JASCO Corporation, Hachioji-shi, Tokyo (JP)

( * ) Notice: Subject to any disclaimer, the term of this patent is extended or adjusted under 35 U.S.C. 154(b) by 322 days.

(21) Appl. No.: 11/960,803

(22) Filed: Dec. 20, 2007

(65) Prior Publication Data

US 2008/0154549 A1 Jun. 26, 2008

(30) Foreign Application Priority Data

Dec. 26, 2006 (JP) ............... 2006-349072

(51) Int. Cl.
G03H 1/26 (2006.01)
H04B 15/00 (2006.01)

(52) U.S. Cl. .............. 702/191; 702/192; 702/193; 702/194

(58) Field of Classification Search .......... 702/66–72, 702/111–112, 188, 191–197
See application file for complete search history.

(56) References Cited

U.S. PATENT DOCUMENTS

2003/0007076 A1* 1/2003 Okisu et al. ............. 348/222.1
2005/0043902 A1* 2/2005 Haaland et al. ............ 702/30
2006/0271310 A1* 11/2006 Ito et al. .................... 702/22

OTHER PUBLICATIONS

Japanese Patent Abstract Publication No. 2000-074826 published Mar. 14, 2000, one page.

* cited by examiner

Primary Examiner—Eliseo Ramos Feliciano
Assistant Examiner—Phuong Huynh
(74) Attorney, Agent, or Firm—Rankin, Hill & Clark LLP

(57) ABSTRACT

A noise-component removing method for removing a noise component from multipoint spectral data that has been generated through measurements performed at measurement points of a sample surface, the method comprising: a PLS analysis step of determining components of the multipoint spectral data for each measurement point in a descending order of eigenvalues of the components by subjecting the multipoint spectral data to multivariate analysis based on the partial least squares regression using a value obtained by quantifying characteristic information about a characteristic of each measurement point, other than spectral information of the measurement point and using the spectral information as an independent variable in the partial least squares regression; and a spectrum reconstruction step of reconstructing the multipoint spectral data for each measurement point to eliminate a component having an eigenvalue lower than a predetermined value, from the components determined in the PLS analysis step.

10 Claims, 6 Drawing Sheets

SAMPLE SURFACE

⇩ IMAGING

IMAGE OF
SAMPLE SURFACE

⇩ IMAGE ANALYSIS

LUMINANCE VALUE
FOR MEASUREMENT POINTS
ON THE SAMPLE SURFACE

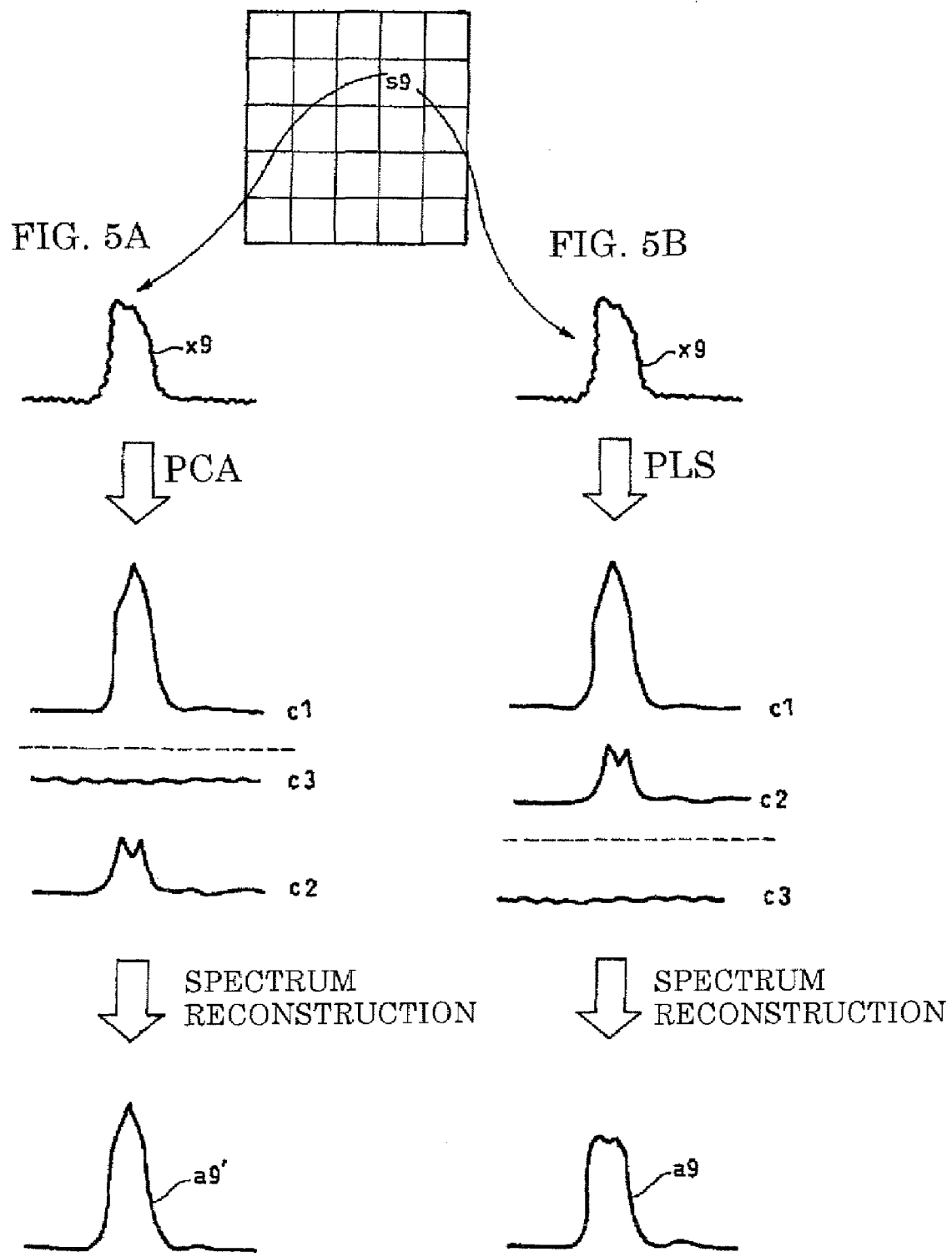

NOISE-COMPONENT REMOVING METHOD

RELATED APPLICATIONS

The present application claims priority of Japanese Patent Application No. 2006-349072, filed on Dec. 26, 2006, which is hereby incorporated herein by reference.

FIELD OF THE INVENTION

The present invention relates to noise-component removing methods, and in particular, to improvements in techniques for separating signal components and noise components of multipoint spectral data.

BACKGROUND OF THE INVENTION

Multipoint spectral data, such as mapping data or temporal change data obtained through sample-surface analysis, is subjected to processing to remove noise components therein.

Smoothing is one known technique to reduce the noise bandwidth of multipoint spectral data. After smoothing, however, the multipoint spectral data will have lower peaks in the spectra or will have wavenumber shifts occurring in the spectra.

Principal component analysis (PCA) is another known technique to remove noise from multipoint spectral data. With a conventional noise-component removing method based on PCA, multipoint spectral data that has been generated through measurements performed at multiple measurement points of a sample surface is separated into a plurality of principle components by PCA, and is then reconstructed to eliminate low-order components from the separated components. As a result, noise components are removed from the multipoint spectral data.

Such a noise-component removing method based on PCA has conventionally been applied, for example, to accumulated data (refer, for example, to Unexamined Japanese Patent Application Publication No. 2000-74826). The conventional noise-component removing method described in Unexamined Japanese Patent Application Publication No. 2000-74826 has also been applied to data corresponding to an area.

However, the inventors of the present invention have found that the noise-component removing method based on PCA may fail to reconstruct a spectrum that differs in shape from a large number of other multipoint spectra, or more specifically, may fail to reconstruct, for example, a spectrum representing a different substance contained at only one point in mapping data.

There have been no appropriate techniques to prevent low-order spectra (signal components) of multipoint spectral data from being lost during reconstruction of the multipoint spectral data, although conventional countermeasures to such signal loss have possibilities for improvement.

SUMMARY OF THE INVENTION

Accordingly, it is an object of the present invention to provide a noise-component removing method for removing noise components from multipoint spectral data with minimum loss of signal components contained in the multipoint spectral data.

After thorough examinations of noise component removal from multipoint spectral data, the inventors have made the present invention based on their findings described below. The inventors have found that multipoint spectral data for multiple measurement points of a sample surface should be weighted not only with spectral information about the spectrum for each measurement point but also with other characteristic information about a characteristic of each measurement point, and then the weighted multipoint spectral data should be subjected to partial least squares (PLS) regression analysis. With this method, even when a large number of multipoint spectra include one spectrum that differs in shape from the other spectra, the multipoint spectral data can be reconstructed without eliminating the different spectrum.

To achieve the above object, the present invention provides a noise-component removing method for removing a noise component from multipoint spectral data that has been generated through measurements performed at measurement points of a sample surface. The noise-component removing method of the present invention includes a concentration-variable calculation process, a PLS analysis process, and a spectrum reconstruction process.

In the concentration-variable calculation process, a value obtained by quantifying characteristic information about a characteristic of each measurement point, other than spectral information of the measurement point, is calculated as a concentration variable to be used in partial least squares regression.

In the PLS analysis process, components of the multipoint spectral data for each measurement point are determined in a descending order of eigenvalues of the components by subjecting the multipoint spectral data to multivariate analysis based on the partial least squares regression using the value calculated in the concentration-variable calculation process as the concentration variable to be used in the partial least squares regression and using the spectral information as an independent variable in the partial least squares regression.

In the spectrum reconstruction process, the multipoint spectral data is reconstructed to eliminate a component having an eigenvalue lower than a predetermined value, from the components of the multipoint spectral data determined in the PLS analysis process.

The multipoint spectral data herein refers to data including mapping data and temporal change data that have been generated through measurement performed at each of multiple measurement points of a sample surface. More specifically, the mapping data for each measurement point consists of values (for example, light intensity values) corresponding to a plurality of wavenumbers, and the temporal change data for each measurement point consists of values (for example, light intensity values) corresponding to a plurality of time points.

It is preferable that the PLS analysis process include a loading-and-score calculation process and an eigenvalue calculation and determination process, and in the spectrum reconstruction process, the multipoint spectral data be reconstructed to eliminate the component having the eigenvalue lower than the predetermined value from the components of the multipoint spectral data determined in the PLS analysis process, and to retain a component having an eigenvalue higher than or equal to the predetermined value.

In the loading-and-score calculation process, a loading and a score of each component of the multipoint spectral data for each measurement point of the sample surface are calculated.

In the eigenvalue calculation and determination process, the eigenvalue of each component is calculated based on the loading and the score of the component calculated in the loading-and-score calculation process, and the components of the multipoint spectral data are categorized in the descending order of the calculated eigenvalues of the components.

<Concentration Variable>

It is also preferable that, in the concentration-variable calculation process, the concentration variable be at least one value selected from the group consisting of a spectral analysis value that is a value obtained by quantifying a result of analysis of the multipoint spectral data for each measurement point of the sample surface, a principle component analysis value that is a value obtained by quantifying a result of principle component analysis of the multipoint spectral data, and an image analysis value that is a value obtained by analyzing each measurement point on an image of the sample surface.

<Spectral Analysis Value>

It is preferable that, in the concentration-variable calculation process, the spectral analysis value be at least one value selected from the group consisting of a peak height at the measurement point of the sample surface, a peak area at the measurement point of the sample surface, a shift amount at the measurement point of the sample surface, an energy value at the measurement point of the sample surface, and an SB area at the measurement point of the sample surface.

The SB area at the measurement point of the sample surface herein refers to the intensity of light that passes through the measurement point of the sample surface.

<Principle Component Analysis Value>

It is preferable that, in the concentration-variable calculation process, the principle component analysis value be at least one value selected from the group consisting of a score at the measurement point of the sample surface obtained through the principle component analysis, a peak height at the measurement point of the sample surface after noise component removal from the multipoint spectral data, and a peak area at the measurement point of the sample surface after noise component removal from the multipoint spectral data.

More specifically, when the principle component analysis uses a smaller number of principle components, a low-order component may be removed together with a noise component during reconstruction of the multipoint spectral data. Even in this case, since the reconstructed multipoint spectral data will retain a high-order component, the peak unique to the high-order component can be used as a key spectral band. The resulting peak height and peak area of the multipoint spectral data will have significant values.

When the principle component analysis uses a larger number of principle components, a low-order component may be retained without being removed together with a noise component during reconstruction of the multipoint spectral data. In this case, the resulting peak height and peak area of the multipoint spectral data after noise component removal based on the principle component analysis will remain substantially the same as the peak height and peak area of the multipoint spectral data before the noise component removal. However, the peak height and peak area of the reconstructed multipoint spectral data, from which noise components have been removed, will have values closer to actual values.

<Image Analysis Value>

It is preferable that, in the concentration-variable calculation process, the image analysis value be at least one value selected from the group consisting of a luminance value of the measurement point on the image, a red value of the measurement point on the image, a green value of the measurement point on the image, and a blue value of the measurement point on the image.

Advantages

A noise-component removing method of the present invention includes a PLS analysis process for determining components of multipoint spectral data for each measurement point of a sample surface as well as calculating eigenvalues of the components by weighting the multipoint spectral data with spectral information about the spectrum for the measurement point and other characteristic information about a characteristic of the measurement point and then subjecting the weighted multipoint spectral data to multivariate analysis based on partial least squares regression, and a spectrum reconstruction process for reconstructing the multipoint spectral data to eliminate components having low eigenvalues, from the components of the multipoint spectral data. The method of the present invention consequently enables noise components to be removed from the multipoint spectral data with minimum loss of signal components contained in the multipoint spectral data.

BRIEF DESCRIPTION OF THE DRAWINGS

FIGS. 5A and 5B show a noise component removal result obtained with the noise-component removing method of the embodiment of the present invention in comparison with a noise component removal result obtained with a conventional method.

DESCRIPTION OF THE PREFERRED EMBODIMENT

An embodiment of the present invention will be described below with reference to the drawings.

Figure 1:
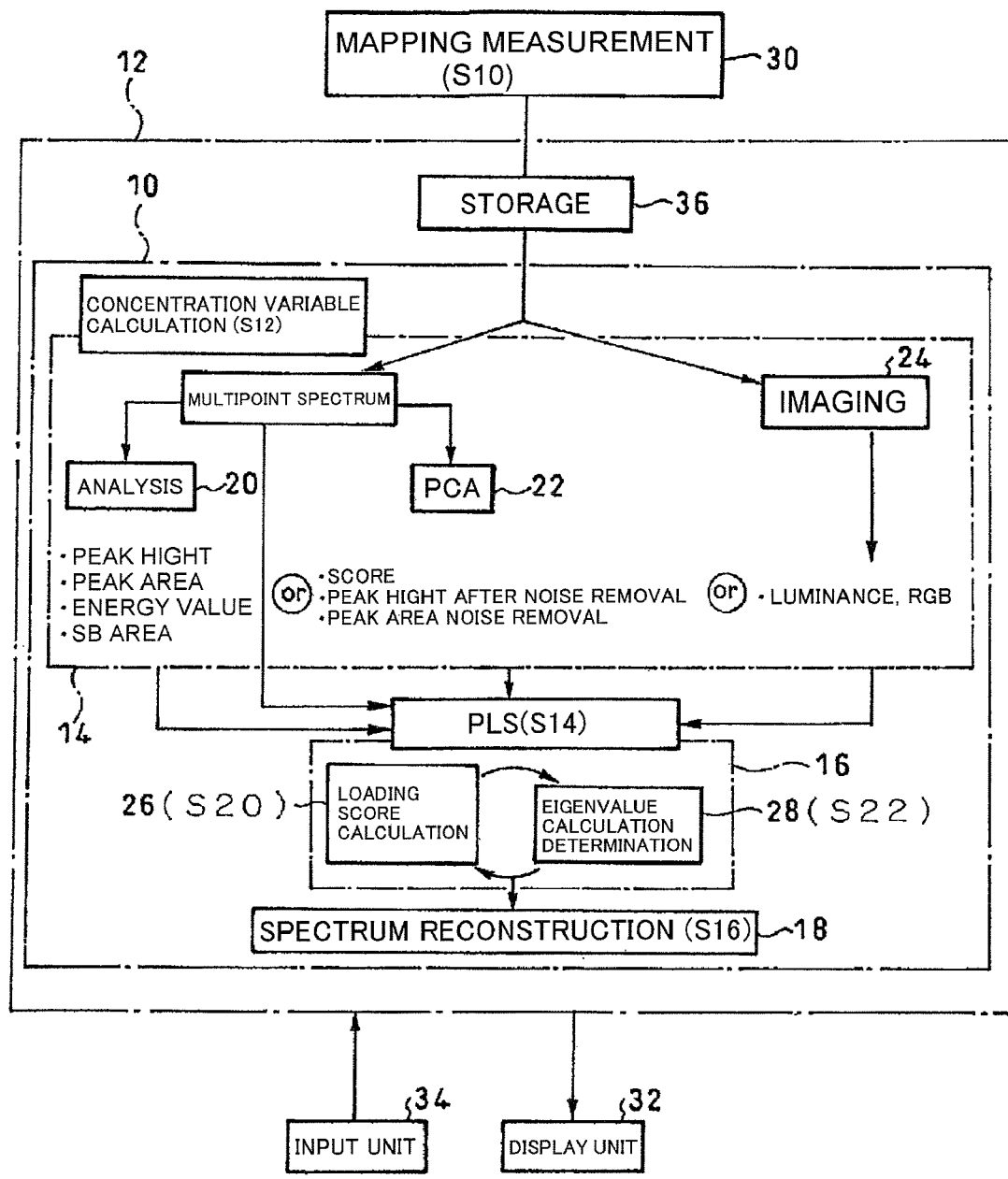
FIG. 1 shows an outline structure of an apparatus that uses a noise-component removing method according to an embodiment of the present invention and also shows a processing flow of the noise-component removing method.

FIG. 1 shows an outline structure of a noise-component removing apparatus 10 that uses a noise-component removing method according to the embodiment of the present invention.

The noise-component removing apparatus 10 may be implemented, for example, by a computer 12. The noise-component removing apparatus 10 removes noise components from a multipoint spectral data set generated through measurements performed at multiple measurement points of a sample surface.

To enable such noise component removal, the noise-component removing apparatus 10 of the present embodiment includes a concentration-variable calculator 14, a partial-least-squares (PLS) analyzer 16, and a spectrum reconstructor 18.

The concentration-variable calculator 14 includes a spectrum analysis unit 20, a principle-component-analysis (PCA) unit 22, and an image analysis unit 24. The concentration-variable calculator 14 performs a concentration-variable calculation process (S12) of the present invention.

The PLS analyzer 16 includes a loading-and-score calculation unit 26 and an eigenvalue calculation-and-determination unit 28. The PLS analyzer 16 performs a PLS analysis process (S14) of the present invention.

The spectrum reconstructor 18 performs a spectrum reconstruction process (S16) of the present invention.

In the present embodiment, a mapping analysis apparatus (spectral-data generator) 30 generates a multipoint spectral data set. The mapping analysis apparatus 30 may be a spectrometer, such as a multi-channel infrared microscope with which mapping analysis is possible.

In the present embodiment, the computer 12 further includes a display unit 32, an input unit 34 such as a keyboard or a mouse, and a storage unit 36.

The noise-component removing apparatus 10, with the above-described structure, for using the noise-component removing method of the present embodiment operates in the following way.

In the present embodiment, multipoint spectral data that has been generated through measurement performed at each measurement point of the sample surface is weighted using spectral information about the spectrum for the measurement point and further using other characteristic information about a characteristic of the measurement point, and then the weighted multipoint spectral data is subjected to PLS regression analysis. Through this, the multipoint spectral data for each measurement point is separated into a plurality of principle components, for each of which an eigenvalue is also calculated in the present embodiment.

In the present embodiment, the multipoint spectral data for each measurement point is weighted not only with the spectral information about the measurement point but also with the other characteristic information about the characteristic of the measurement point. In this case, even when, for example, a large number of multipoint spectra include one spectrum that differs in shape from the other spectra, if that spectrum corresponds to a signal component, an eigenvalue calculated for the signal component will be remarkably higher than an eigenvalue calculated for a noise component. Based on the eigenvalues, the signal component and the noise component can be differentiated from each other in a reliable manner. With this method of the present embodiment, the multipoint spectral data is reconstructed to reliably retain the spectrum of such a low-order signal component.

In the present embodiment, the multipoint spectral data is reconstructed to eliminate components having eigenvalues lower than a predetermined value. With this method of the present embodiment, noise components are reliably removed from multipoint spectral data with minimum loss of signal components contained in the multipoint spectral data.

The operation of the present embodiment will be described below in detail.

As shown in FIG. 1, the noise-component removing method of the present embodiment includes a spectral-data generation process (S10), the concentration-variable calculation process (S12), the PLS analysis process (S14), and the spectrum reconstruction process (S16).

<Spectral Data Generation Process>

In the spectral-data generation process (S10), the mapping analysis apparatus 30 performs mapping analysis of a sample surface. In detail, the mapping analysis apparatus 30 divides the sample surface into a plurality of measurement points (small regions), and generates spectral data for each measurement point of the sample surface through measurement performed at each measurement point. The generated spectral data for each measurement point of the sample surface is stored in the storage unit 36 together with position information of each measurement point.

In the present embodiment, the spectral-data generation process (S10) is performed to generate a multipoint spectral data set.

<Concentration Variable Calculation Process>

In the concentration-variable calculation process (S12), a concentration variable that needs to be used in PLS (partial least squares) regression is calculated. The concentration variable used here is a value obtained by quantifying characteristic information about a characteristic of each measurement point of the sample surface. The characteristic information is other than multipoint spectral data for each measurement point of the sample surface, or more specifically, other than information about light intensity values corresponding to a plurality of wavenumbers (referred to as spectral information). In the present embodiment, the mapping analysis apparatus 30 images the sample surface, and the image analysis unit 24 of the computer 12 analyzes the imaged sample surface to generate luminance values of the measurement points on the imaged sample surface. Values are then calculated based on these luminance values of the measurement points, and the calculated values are used as a concentration-variable data set.

<PLS Analysis Process>

The PLS analysis process (S14) is then performed after the concentration-variable data set is calculated.

In the PLS analysis process (S14), the concentration-variable data set calculated in the concentration-variable calculation process (S12) and the multipoint spectral data set, which is an independent-variable data set, are subjected to multivariate analysis based on PLS regression. Through the multivariate analysis, the multipoint spectral data for one measurement point of the sample surface is separated into a plurality of components, for each of which an eigenvalue is also calculated.

To enable such multivariate analysis, a loading-and-score calculation process (S20) and an eigenvalue calculation-and-determination process (S22) are performed in the present embodiment.

In the loading-and-score calculation process (S20), loadings and scores are calculated for the components of the multipoint spectral data for each measurement point of the sample surface.

In the eigenvalue calculation-and-determination process (S22), eigenvalues are calculated for the components of the multipoint spectral data for each measurement point of the sample surface based on the loadings and scores calculated in the loading-and-score calculation process (S20).

In the present embodiment, a component having an eigenvalue lower than a predetermined value is determined to be a noise component, whereas a component having an eigenvalue higher than or equal to the predetermined value is determined to be a signal component.

<Spectrum Reconstruction Process>

The spectrum reconstruction process (S16) is then performed after the multivariate analysis is performed.

In the spectrum reconstruction process (S16), the multipoint spectral data is reconstructed to eliminate components having eigenvalues lower than the predetermined value, from the components of the multipoint spectral data determined in the PLS analysis process (S14).

The multipoint spectral data for each measurement point of the sample surface is subjected to the processing described above. The multipoint spectral data (the reconstructed multipoint spectral data) for each measurement point is then used to reconstruct the multipoint spectral data set for the entire sample surface.

Figure 2:
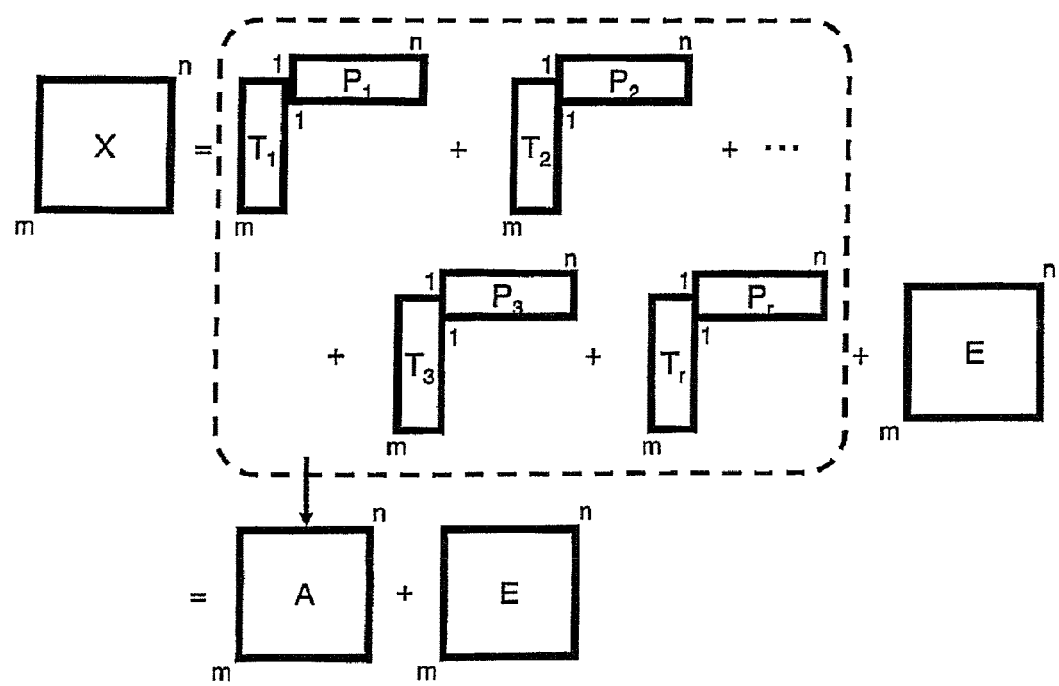
FIG. 2 shows a multipoint spectral data set characteristic of the noise-component removing method according to the embodiment of the present invention.

FIG. 2 shows one example of the multipoint spectral data set for the sample surface that is reconstructed with the method of the present embodiment.

In FIG. 2, X(m, n) is a multipoint spectral data set, A(m, n) is a reconstructed multipoint spectral data set, E(m, n) is a noise component, r is the number of factors, P is a loading, T is a score, m is the number of sampling points (the number of measurement points), and n is the number of data points of the spectral data (the number of wavenumbers contained in the spectral data).

The reconstructed multipoint spectral data set A shown in the figure, from which noise components have been removed with significantly reduced loss of low-order components (signal components) of the spectra, will provide a successful surface analysis result of the sample surface.

Application to Inspect PET

The noise-component removing method of the present embodiment will now be applied, for example, to the inspection of products made of polyethylene terephthalate (PET; hereafter referred to as "PET products").

Figure 3A:
FIGS. 3A to 3C show a concentration-variable calculation process characteristic of the noise-component removing method according to the embodiment of the present invention.

In the present embodiment, a PET product is assumed to contain silicon, an impurity, at a measurement point $s_9$ on its sample surface and to have PET present at other measurement points on the sample surface, as shown in FIG. 3A.

Figure 3B:
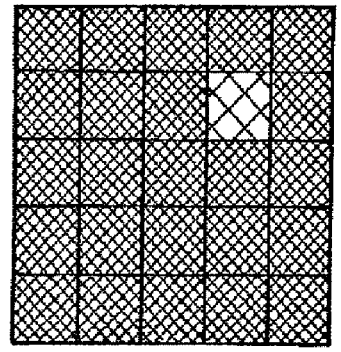

This sample surface is imaged to generate image information corresponding to the multiple measurement points shown in FIG. 3B. On the sample surface shown in FIG. 3B, the measurement point $s_9$, which contains silicon, is even visually distinguishable from the other measurement points.

Figure 3C:

The image information is then analyzed using a computer to calculate luminance values for the measurement points on the imaged sample surface. FIG. 3C shows a luminance value for each measurement point on the sample surface, which represents image information other than spectral information. On the sample surface shown in FIG. 3C as well, the measurement point $s_9$, which contains silicon, is distinguishable from the other measurement points ($b_2 > b_1$, where $b_2$ is the luminance value for the measurement point $s_9$ and $b_1$ is the luminance value for the other measurement points).

These luminance values for the measurement points are then used to calculate a concentration-variable data set needed for use in PLS regression.

The PLS regression analysis of multipoint spectral data is performed using the calculated concentration variables in the manner described below.

<High-Order Component of Spectral Data>

Figure 4:
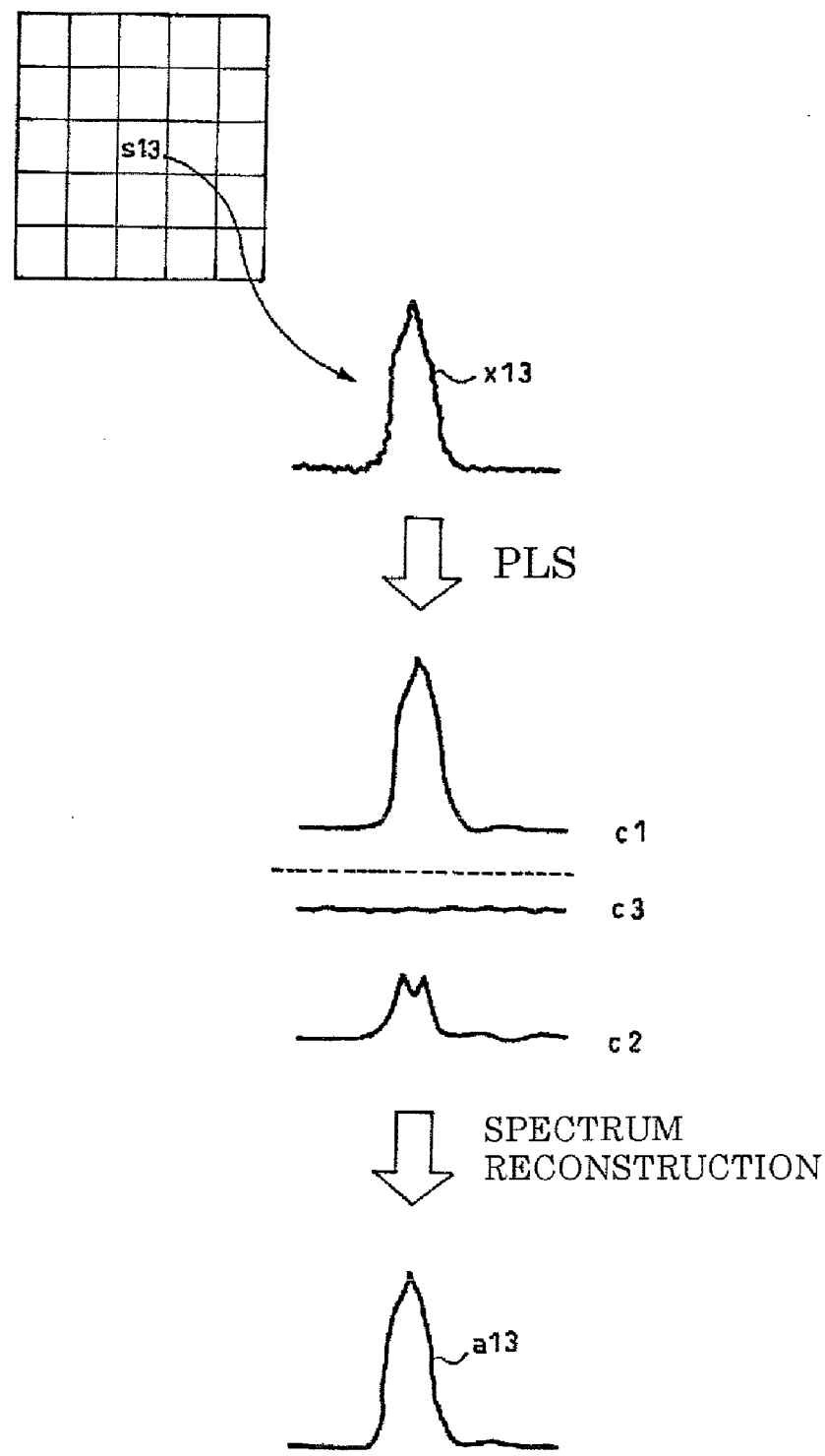
FIG. 4 shows an analysis process and a reconstruction process characteristic of the noise-component removing method according to the embodiment of the present invention.

First, the PLS regression analysis of multipoint spectral data for each of the large number of measurement points at which PET is present (hereafter referred to as "PET points") will be examined below with reference to FIG. 4.

Multipoint spectral data $x_{13}$ for a measurement point $s_{13}$ shown in FIG. 3A, which is one of the large number of PET points, is subjected to multivariate analysis using the concentration variable that has been calculated based on the luminance value calculated for the measurement point $s_{13}$. As a result of the multivariate analysis, the multipoint spectral data $x_{13}$ for the measurement point $s_{13}$ is separated into a component $c_1$, a component $c_2$, and a component $c_3$.

When the components $c_1$, $c_2$, and $c_3$ of the multipoint spectral data $x_{13}$ are compared with one another, the contribution (influence) of the component $c_1$ to (on) the spectrum is significantly greater than the contribution (influence) of the other two components, although the contribution (influence) of the component $c_1$ to (on) the luminance is small. In this case, the components of the multipoint spectral data $x_{13}$ are categorized as the components $c_1$, $c_3$, and $c_2$ in the descending order of eigenvalues calculated for these components.

The multipoint spectral data $x_{13}$ for the measurement point $s_{13}$ is reconstructed to eliminate the components $c_2$ and $c_3$ having the eigenvalues lower than a predetermined value and to retain the component $c_1$ having the eigenvalue higher than the predetermined value, among the components $c_1$ to $c_3$ determined through the multivariate analysis of the multipoint spectral data $x_{13}$ for the measurement point $s_{13}$. The resulting multipoint spectral data is referred to as reconstructed multipoint spectral data $a_{13}$.

As described above, the noise components are reliably removed from the multipoint spectral data $x_{13}$ for the measurement point $s_{13}$. The resulting multipoint spectral data for the measurement point $s_{13}$ shows the presence of PET in a more enhanced manner as compared with the data from which the noise components have yet to be removed using the method of the present embodiment.

<Low-Order Components of Spectral Data>

The contribution (influence) of a silicon signal component to (on) the spectrum may be significantly lower than the contribution (influence) of a PET signal component. When the contribution (influence) of the silicon signal component to (on) the spectrum is as low as the contribution (influence) of a noise component, the conventional method may fail to differentiate between the silicon signal component and the noise component. With the conventional method, the multipoint spectral data may be reconstructed to eliminate the silicon signal component together with the noise component. In this case, the reconstructed multipoint spectral data will fail to provide a successful surface analysis result.

More specifically, with the conventional noise-component removing method based on PCA, the multipoint spectral data $x_9$ for the measurement point $s_9$, at which the PET product contains silicon, is subjected to multivariate analysis based on PCA. As a result of the multivariate analysis, the multipoint spectral data $x_9$ for the measurement point $s_9$ is separated into a component $c_1$, a component $c_2$, and a component $c_3$, as shown in FIG. 5A.

With the conventional method, only the spectral information for the measurement point $s_9$ is used in PCA. In this case, the contribution (influence) of the component $c_2$, which contains information about silicon, is determined to be lower than the contribution (influence) of the component $c_1$, which contains information about PET. More specifically, the contribution (influence) of the component $c_2$ is determined to be as low as the contribution (influence) of the component $c_3$, which is a noise component.

With the conventional method, the multipoint spectral data $x_9$ for the measurement point $s_9$ is reconstructed to eliminate the component $c_2$ and the component $c_3$, which have eigenvalues lower than the predetermined value, from the components of the multipoint spectral data $x_9$ for the measurement point $s_9$, determined through the multivariate analysis based on PCA. The resulting multipoint spectral data is referred to as reconstructed multipoint spectral data $a_9'$.

Although the PET product contains silicon at the measurement point $s_9$, the reconstructed multipoint spectral data $a_9'$ contains no spectral information about the noise component as well as no spectral information about silicon.

In contrast, FIG. 5B shows a noise component removal result obtained with the noise-component removing method of the present embodiment. With the method of the present embodiment, the multipoint spectral data $x_9$ for the measurement point $s_9$ is subjected to multivariate analysis based on PLS using the concentration variable that has been calculated based on the luminance value of the measurement point $s_9$. As a result of the multivariate analysis, the multipoint spectral data $x_9$ for the measurement point $s_9$ is separated into a component $c_1$, a component $c_2$, and a component $c_3$.

Here, when only the spectral information is used in the analysis, the contribution (influence) of the component $c_2$ shown in FIG. 5B will be determined to be as low as the contribution (influence) of the component $c_2$ shown in FIG. 5A. With the method of the present embodiment, however, the multipoint spectral data is weighted not only with the spectral information but also with luminance information. In this case, the multipoint spectral data $x_9$ for the measurement point $s_9$ is weighted by a greater amount than the multipoint spectral data for each of the other measurement points. As a result of this weighting, an eigenvalue calculated for the component $c_2$, which is a silicon signal component, is remarkably higher than an eigenvalue calculated for the component $c_3$, which is a noise component, although the contribution (influence) of the component $c_2$ is as low as the contribution (influence) of the component $c_3$.

Thus, the multivariate analysis result obtained with the method of the present embodiment shown in FIG. 5B indicates that the component $c_2$, which is the silicon signal component, has a higher level than the same component indicated by the multivariate analysis result shown in FIG. 5A. Accordingly, the multipoint spectral data $x_9$ for the measurement point $s_9$ can be reconstructed to retain the components $c_1$ and $c_2$, which are signal components, and to eliminate the component $c_3$, which is the noise component. The resulting multipoint spectral data is referred to as reconstructed multipoint spectral data $a_9$.

With the method of the present embodiment described above, only the noise component is reliably removed from the multipoint spectral data $x_9$ for the measurement point $s_9$ with sufficiently reduced loss of the signal component for silicon.

In the multivariate analysis performed with the method of the present embodiment, the multipoint spectral data is weighted not only with the spectral information but also with the luminance information, as described above. As a result, the eigenvalue calculated for the component $c_2$, which is a signal component, is remarkably higher than the eigenvalue calculated for the component $c_3$, which is a noise component. Thus, even when the contribution (influence) of the silicon signal component is as low as the contribution (influence) of the noise component based solely on the spectral information, the multipoint spectral data is reconstructed while retaining the silicon signal component. With the method of the present embodiment, a signal component representing, for example, a different substance contained only at one point of mapping data is retained and only a noise component is reliably removed from the data.

<Surface Analysis Results>

The noise-component removing method of the present embodiment provides surface analysis results different from results obtained with the conventional method.

Figure 6A:
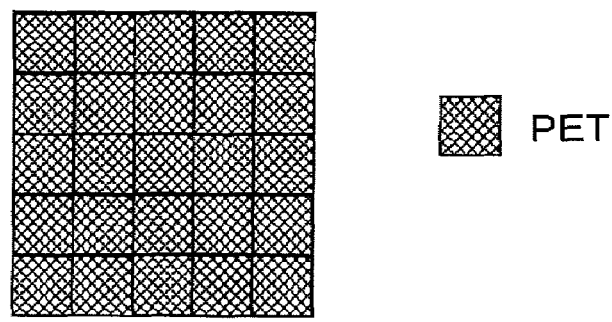
FIGS. 6A and 6B show a surface analysis result obtained with the noise-component removing method according to the embodiment of the present invention in comparison with a surface analysis result obtained with the conventional method.

For example, mapping data shown in FIG. 6A is generated with the conventional method. In this case, when each measurement point of the mapping data becomes smaller with respect to the entire sample surface, a spectrum for one small measurement point that differs from other small measurement points within the large sample surface may become more difficult to reconstruct. As a result, the mapping data shown in FIG. 6A may be reconstructed to eliminate information about a signal component corresponding to the different measurement point. In this case, silicon contained at the measurement point $s_9$ may fail to be detected during the surface analysis.

Figure 6B:
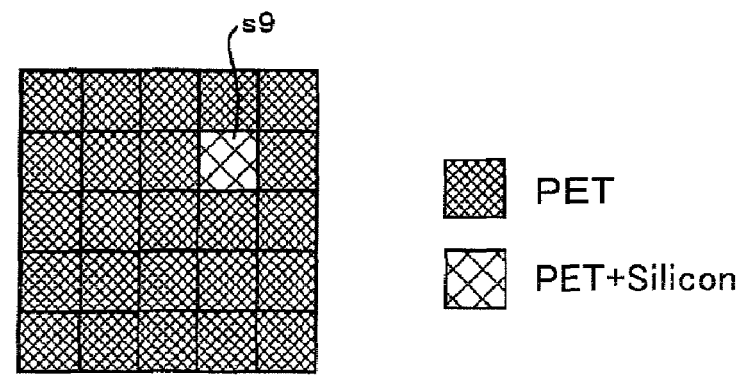

In contrast, mapping data shown in FIG. 6B is generated with the method of the present embodiment. Even when each measurement point of the mapping data becomes smaller, silicon contained at one measurement point, for example, at the measurement point $s_9$, will be reliably detected during the surface analysis. The method of the present embodiment enables, for example, impurities to be detected in the inspection of PET products. When a PET product contains an impurity, the method of the present embodiment enables the point of the PET product containing the impurity to be detected as, for example, the measurement point $s_9$, and also the type of the impurity to be determined as being, for example, silicon.

In this manner, the method of the present embodiment provides a successful surface analysis result.

Advantages

As described above, the method of the present embodiment significantly reduces the noise bandwidth of data, and therefore, improves the quality of two-dimensional mapping data or temporal change spectral data. Consequently, the search hit rate is improved.

As described above, the method of the present embodiment reduces the noise bandwidth of multipoint spectral data, or in other words, improves the signal-to-noise (S/N) ratio of the data based on PLS regression. The method of the present embodiment therefore reduces the number of times data needs to be accumulated, consequently reducing the time required for data measurement.

The method of the present embodiment enables noise components to be removed from a multipoint spectral data set with minimum loss of signal components contained in the multipoint spectral data set.

Modifications

<Concentration Variable>

Although the present embodiment describes the case in which the luminance value for each measurement point of the imaged sample surface is used as the concentration variable to be used in PLS regression, the concentration variable is not be limited to the luminance value. For example, it is also preferable that the concentration variable be at least one value selected from the group consisting of a red (R) value, a green (G) value, and a blue (B) value of each measurement point of the imaged sample surface.

In the present embodiment, the concentration variable may be any value obtained by quantifying information about a characteristic of each measurement point of the sample surface, other than spectral information. For example, it is preferable that the concentration variable be at least one value selected from the group consisting of a spectral analysis value and a PCA analysis value described below.

More specifically, it is also preferable that the spectral analysis value be a value obtained by quantifying a result of analysis of multipoint spectral data for each measurement point of the sample surface. It is preferable that the spectral analysis value be at least one value selected from the group consisting of a peak height, a peak area, a shift amount, an energy value, and an SB area (the intensity of light that passes through each measurement point).

It is also preferable that the PCA analysis value be a value obtained by quantifying a result of PCA of multipoint spectral data for each measurement point of the sample surface. It is preferable that the PCA analysis value be at least one value selected from the group consisting of a score at each measurement point of the sample surface obtained through the PCA, a peak height at each measurement point of the sample surface after noise component removal from the multipoint spectral data, and a peak area at each measurement point of the sample surface after noise component removal from the multipoint spectral data.

What is claimed is:

1. A noise-component removing method for removing a noise component from multipoint spectral data that has been generated through measurements performed at measurement points of a sample surface, the method comprising:

a concentration-variable calculation step of calculating, as a concentration variable to be used in partial least squares regression, a value obtained by quantifying characteristic information about a characteristic of each measurement point, other than spectral information of the measurement point;

a partial least square (PLS) analysis step of determining components of the multipoint spectral data for each measurement point in a descending order of eigenvalues of the components by subjecting the multipoint spectral data to multivariate analysis based on the partial least squares regression using the value calculated in the concentration-variable calculation step as the concentration variable to be used in the partial least squares regression and using the spectral information as an independent variable in the partial least squares regression; and a spectrum reconstruction step of reconstructing, using the processor, the multipoint spectral data for each measurement point to eliminate a component having an eigenvalue lower than a predetermined value, from the components determined in the PLS analysis step.

2. A noise-component removing method according to claim 1, wherein the PLS analysis step comprises a loading-and-score calculation step of calculating a loading and a score of each component of the multipoint spectral data for each measurement point of the sample surface, and an eigenvalue calculation-and-determination step of calculating the eigenvalue of each component based on the loading and the score of the component calculated in the loading-and-score calculation step, and categorizing the components of the multipoint spectral data in the descending order of the calculated eigenvalues of the components, and in the spectrum reconstruction step, the multipoint spectral data is reconstructed to eliminate the component having the eigenvalue lower than the predetermined value, from the components of the multipoint spectral data determined in the PLS analysis step, and to retain a component having an eigenvalue higher than or equal to the predetermined value.

3. A noise-component removing method according to claim 1, wherein in the concentration-variable calculation step, the concentration variable is at least one value selected from the group consisting of a spectral analysis value that is a value obtained by quantifying a result of analysis of the multipoint spectral data for each measurement point of the sample surface, a principle component analysis value that is a value obtained by quantifying a result of principle component analysis of the multipoint spectral data, and an image analysis value that is a value obtained by analyzing each measurement point on an image of the sample surface.

4. A noise-component removing method according to claim 2, wherein in the concentration-variable calculation step, the concentration variable is at least one value selected from the group consisting of a spectral analysis value that is a value obtained by quantifying a result of analysis of the multipoint spectral data for each measurement point of the sample surface, a principle component analysis value that is a value obtained by quantifying a result of principle component analysis of the multipoint spectral data, and an image analysis value that is a value obtained by analyzing each measurement point on an image of the sample surface.

5. A noise-component removing method according to claim 3, wherein in the concentration-variable calculation step, the spectral analysis value is at least one value selected from the group consisting of a peak height at the measurement point of the sample surface, a peak area at the measurement point of the sample surface, a shift amount at the measurement point of the sample surface, an energy value at the measurement point of the sample surface, and an SB area at the measurement point of the sample surface.

6. A noise-component removing method according to claim 4, wherein in the concentration-variable calculation step, the spectral analysis value is at least one value selected from the group consisting of a peak height at the measurement point of the sample surface, a peak area at the measurement point of the sample surface, a shift amount at the measurement point of the sample surface, an energy value at the measurement point of the sample surface, and an SB area at the measurement point of the sample surface.

7. A noise-component removing method according to claim 3, wherein in the concentration-variable calculation step, the principle component analysis value is at least one value selected from the group consisting of a score at the measurement point of the sample surface obtained through the principle component analysis, a peak height at the measurement point of the sample surface after noise component removal from the multipoint spectral data, and a peak area at the measurement point of the sample surface after noise component removal from the multipoint spectral data.

8. A noise-component removing method according to claim 4, wherein in the concentration-variable calculation step, the principle component analysis value is at least one value selected from the group consisting of a score at the measurement point of the sample surface obtained through the principle component analysis, a peak height at the measurement point of the sample surface after noise component removal from the multipoint spectral data, and a peak area at the measurement point of the sample surface after noise component removal from the multipoint spectral data.

9. A noise-component removing method according to claim 3, wherein in the concentration-variable calculation step, the image analysis value is at least one value selected from the group consisting of a luminance value of the measurement point on the image, a red value of the measurement point on the image, a green value of the measurement point on the image, and a blue value of the measurement point on the image.

10. A noise-component removing method according to claim 4, wherein in the concentration-variable calculation step, the image analysis value is at least one value selected from the group consisting of a luminance value of the measurement point on the image, a red value of the measurement point on the image, a green value of the measurement point on the image, and a blue value of the measurement point on the image.

* * * * *